United States Patent
Hwang et al.

(10) Patent No.: US 11,581,535 B2
(45) Date of Patent: Feb. 14, 2023

(54) HIGH-NICKEL POSITIVE ELECTRODE ACTIVE MATERIAL, PRODUCING METHOD THEREOF, POSITIVE ELECTRODE AND LITHIUM SECONDARY BATTERY COMPRISING THE SAME

(71) Applicant: LG Chem, Ltd., Seoul (KR)

(72) Inventors: Jin Tae Hwang, Daejeon (KR); Dong Hun Lee, Daejeon (KR); Sung Bin Park, Daejeon (KR); Hyung Man Cho, Daejeon (KR); Jung Min Han, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 480 days.

(21) Appl. No.: 16/701,621

(22) Filed: Dec. 3, 2019

(65) Prior Publication Data
US 2020/0185716 A1    Jun. 11, 2020

(30) Foreign Application Priority Data
Dec. 10, 2018 (KR) ............ 10-2018-0158015

(51) Int. Cl.
*H01M 4/525* (2010.01)
*H01M 10/0525* (2010.01)
*H01M 4/50* (2010.01)
*H01M 4/04* (2006.01)
*H01M 4/46* (2006.01)
*H01M 4/02* (2006.01)

(52) U.S. Cl.
CPC ......... *H01M 4/525* (2013.01); *H01M 4/0471* (2013.01); *H01M 4/463* (2013.01); *H01M 4/50* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 2011/0033750 A1* | 2/2011 | Hosokawa ........... C01G 53/006 429/223 |
| 2012/0282524 A1 | 11/2012 | Kono et al. |
| 2014/0205898 A1 | 7/2014 | Lee et al. |
| 2014/0356712 A1 | 12/2014 | Song et al. |
| 2016/0181611 A1 | 6/2016 | Cho et al. |

(Continued)

FOREIGN PATENT DOCUMENTS

| JP | 5364801 B2 | 12/2013 |
| KR | 20050052266 A | 6/2005 |
| KR | 20130033155 A | 4/2013 |

(Continued)

*Primary Examiner* — Wyatt P McConnell
(74) *Attorney, Agent, or Firm* — Lerner, David, Littenberg, Krumholz & Mentlik, LLP

(57) ABSTRACT

A method for producing a positive electrode active material, a positive electrode active material produced thereby, and a positive electrode and a lithium secondary battery including the same are provided. The method includes preparing a nickel-manganese-aluminum precursor having an atomic fraction of nickel of 90 atm % or greater in all transition metals, and mixing the nickel-manganese-aluminum precursor, a cobalt raw material, and a lithium raw material and heat treating the mixture.

6 Claims, 6 Drawing Sheets

Example 1

(56) References Cited

U.S. PATENT DOCUMENTS

2019/0036119 A1  1/2019  Lee et al.

FOREIGN PATENT DOCUMENTS

| KR | 20160023147 A | 3/2016 |
|---|---|---|
| KR | 20160063982 A | 6/2016 |
| KR | 20160074236 A | 6/2016 |
| KR | 101785266 B1 | 11/2017 |
| KR | 20180004672 A | 1/2018 |
| KR | 101852792 B1 | 4/2018 |

* cited by examiner

HIGH-NICKEL POSITIVE ELECTRODE ACTIVE MATERIAL, PRODUCING METHOD THEREOF, POSITIVE ELECTRODE AND LITHIUM SECONDARY BATTERY COMPRISING THE SAME

CROSS-REFERENCE TO RELATED APPLICATION

The present application claims priority to Korean Patent Application No. 10-2018-0158015, filed on Dec. 10, 2018 in the Korean Intellectual Property Office, the disclosure of which is incorporated herein in its entirety by reference.

TECHNICAL FIELD

The present invention relates to a high-nickel positive electrode active material and a producing method thereof, the positive electrode active material being capable of suppressing the formation of a rock salt phase even while using a small amount of cobalt and having excellent initial charge and discharge properties, rate properties, and high-temperature lifespan properties.

BACKGROUND ART

In recent years, with the popularization of mobile devices and electric power tools and the increasing demand for environmentally friendly electric vehicles, the requirements for an energy source driving the same are gradually increasing. In particular, there is a demand for developing a positive electrode active material having stable driving and long-life properties under high energy density and high voltage.

As a positive electrode active material of a lithium secondary battery, a lithium transition metal composite oxide is used. Among such lithium transition metal composite oxides, a lithium cobalt composite metal oxide such as $LiCoO_2$, which has a high functional voltage and excellent capacity properties, has been mainly used. However, $LiCoO_2$ is very poor in thermal properties due to the destabilization of a crystal structure according to de-lithium, and is also expensive. Therefore, $LiCoO_2$ has a limitation in being used as a power source in a field such as an electric vehicle or the like in a large amount.

As a material to replace $LiCoO_2$, a lithium manganese composite metal oxide ($LiMnO_2$ or $LiMn_2O_4$, and the like), a lithium iron phosphate compound ($LiFePO_4$ and the like), or a lithium nickel composite metal oxide ($LiNiO_2$ and the like) has been developed. However, when compared with $LiCoO_2$, $LiNiO_2$ is poor in thermal stability, and when an internal short circuit occurs due to external pressure or the like in a charged state, a positive electrode active material itself is decomposed, thereby causing the rupture and ignition of a battery.

Accordingly, as a method for improving the thermal stability of $LiNiO_2$, which is low, while maintaining the excellent reversible capacity thereof, a nickel cobalt manganese-based lithium composite transition metal oxide in which a part of Ni is substituted with Mn and Co (hereinafter, simply referred to as an 'NCM-based lithium oxide') has been developed. However, typical NCM-based lithium oxides which have been developed up to the present have insufficient capacity, so that there has been a limitation in the application thereof.

In order to overcome such limitations, in recent years, studies have been conducted to increase the content of Ni in an NCM-based lithium oxide to improve the capacity properties of a positive electrode active material. In recent years, high-nickel positive electrode active materials containing Ni in an amount of 80 atm % or greater in all transition metals are being developed. However, such high-nickel positive electrode active materials have a problem in that the structural stability of the active material is rapidly reduced when exposed to a high temperature, so that lifespan properties are rapidly deteriorated.

In addition, there is a problem with a positive electrode active material of a high-nickel layered structure having a high Ni content in that during synthesizing the positive electrode active material, a rock salt phase is easily formed on the surface thereof, and if the rock salt phase is formed, output properties and charge and discharge properties are deteriorated. If the content of cobalt in the positive electrode active material is increased, the mixing of cations or the formation of a rock salt phase may be suppressed to a certain degree. However, since cobalt is expansive, production costs are increased, thereby reducing economic feasibility.

Accordingly, there is a demand for developing a high-nickel positive electrode active material which is capable of suppressing the formation of a rock salt phase while using a small amount of cobalt and which has excellent initial charge and discharge properties, rate properties, and high-temperature lifespan properties.

PRIOR ART DOCUMENT

Patent Document

Korean Patent Laid-open Publication No. 10-2016-0063982 (Date of publication: Jun. 7, 2016)

DISCLOSURE OF THE INVENTION

Technical Problem

An aspect of the present invention provides a high-nickel positive electrode active material and a producing method thereof, the positive electrode active material being capable of suppressing the formation of a rock salt phase while using a small amount of cobalt in a range of 4000-7000 ppm and having excellent output properties and high-temperature properties.

Another aspect of the present invention provides a positive electrode and a lithium secondary battery including the positive electrode active material described above.

Technical Solution

According to an aspect of the present invention, there is provided a method for producing a positive electrode active material, the method including preparing a nickel-manganese-aluminum precursor having an atomic fraction of nickel of 90 atm % or greater in all transition metals of the nickel-manganese-aluminum precursor, and mixing the nickel-manganese-aluminum precursor, a cobalt raw material, and a lithium raw material and then heat treating the mixture.

According to another aspect of the present invention, there is provided a positive electrode active material including a lithium composite transition metal oxide containing nickel, manganese, aluminum, and cobalt, wherein the atomic fraction of nickel is 90 atm % or greater in all transition metals of the lithium composite transition metal oxide, the content of cobalt is 4000-7000 ppm based on the total weight of the lithium composite transition metal oxide, and the thickness of a rock salt phase formed on a surface portion of the lithium composite transition metal oxide is less than 5 nm.

According to yet another aspect of the present invention, there are provided a positive electrode and a lithium secondary battery including the positive electrode active material of the present invention described above.

Advantageous Effects

As in the present invention, when a positive electrode active material is produced by mixing and firing a precursor not containing cobalt, a lithium raw material, and a cobalt raw material, even though a small amount of cobalt is used, a positive electrode active material having almost no rock salt phase may be produced. Accordingly, the deterioration in output properties and charge and discharge properties caused by the formation of the rock salt phase may be minimized.

In addition, the positive electrode active material produced according to the present invention has excellent structural stability when compared with a high-nickel positive electrode active material produced by a typical method, and thus, exhibits high capacity retention rate and a low resistance increase rate.

MODE FOR CARRYING OUT THE INVENTION

Figure 1:
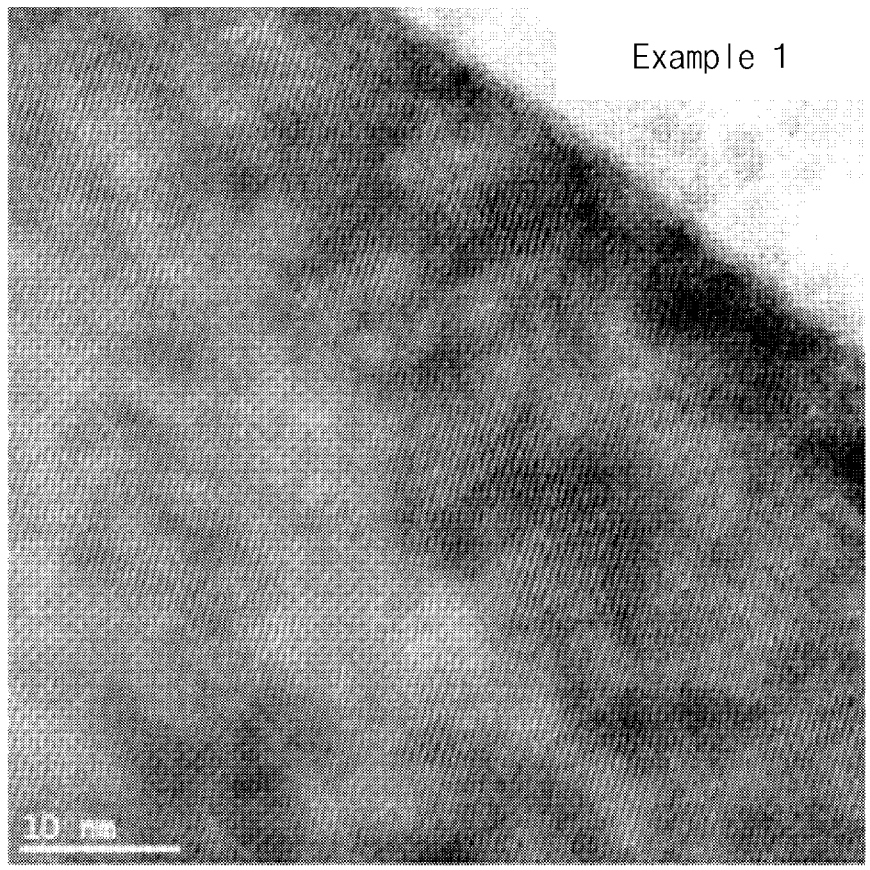
FIG. 1 is a transmission electron microscope (TEM) photograph of the surface of a positive electrode active material produced by Example 1.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context and the technical idea of the invention, based on the principle that an inventor may properly define the meaning of the words or terms to best explain the invention.

In the present specification, the content of each element in a positive electrode active material may be measured through an inductive coupled plasma (ICP) analysis using an inductively coupled plasma light-emission spectrometer (ICP-OES; Optima 7300DV, PerkinElmer Corporation).

In the present specification, % means wt % unless otherwise stated.

Hereinafter, the present invention will be described in more detail.

The present inventors have repeatedly conducted research on developing a high-nickel positive electrode active material excellent in output properties and high-temperature properties while using a small amount of cobalt, and have found that it is possible to produce a positive electrode active material having almost no rock salt phase even though a small amount of cobalt is used when the positive electrode active material is produced by mixing and then firing a precursor not containing cobalt, a lithium raw material, and a cobalt raw material. Also, the present inventors have found that the positive electrode active material produced as described above is capable of implementing excellent high-temperature lifespan properties when compared with a typical high-nickel positive electrode active material, and have completed the present invention.

<Method for Producing Positive Electrode Active Material>

First, a method for producing a positive electrode active material according to the present invention will be described.

The method for producing a positive electrode active material of the present invention includes (1) preparing a nickel-manganese-aluminum precursor having an atomic fraction of nickel of 90 atm % or greater in all transition metals of the nickel-manganese-aluminum precursor, and (2) mixing the nickel-manganese-aluminum precursor, a cobalt raw material, and a lithium raw material and then heat treating the mixture.

Hereinafter, each step of the producing method of the present invention will be described in more detail.

(1) Preparing Nickel-Manganese-Aluminum Precursor

First, a nickel-manganese-aluminum precursor having an atomic fraction of nickel of 90 atm % or greater in all transition metals is prepared.

Specifically, the nickel-manganese-aluminum precursor contains nickel, manganese, and aluminum, and may be a hydroxide or an oxyhydroxide having an atomic fraction of nickel of 90 atm % or greater in all transition metals of the nickel-manganese-aluminum precursor.

Specifically, the nickel-manganese-aluminum precursor may be a compound represented by either [Formula 1] below or [Formula 2] below.

$$Ni_{a1}Mn_{b1}Al_{c1}M_{d1}O\cdot OH \qquad \text{[Formula 1]}$$

In Formula 1, M is a doping element, and may be one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and $0.90 \leq a1 \leq 0.98$, $0.01 \leq b1 \leq 0.1$, $0.01 \leq c1 < 0.1$, and $0 \leq d1 \leq 0.02$.

$$Ni_{a2}Mn_{b2}Al_{c2}M_{d2}(OH)_2 \qquad \text{[Formula 2]}$$

In Formula 2, M is a doping element, and may be one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and $0.90 \leq a2 \leq 0.98$, $0.01 \leq b2 < 0.1$, $0.01 \leq c2 < 0.1$, and $0 \leq d2 \leq 0.02$.

a1 and a2 represent the atomic fraction of nickel in all transition metals of a precursor, b1 and b2 represent the atomic fraction of manganese in all the transition metals, and c1 and c2 represent the atomic fraction of aluminum in all the transition metals. In addition, d1 and d2 represent the atomic fraction of a doping element M in all the transition metals.

When a1, a2, b1, b2, c1, c2, d1, and d2 satisfy the above ranges, a positive electrode active material having a nickel content of 90 atm % or greater may be produced.

In the present invention, a precursor not containing cobalt is used as a transition metal precursor. Typically, a precursor containing nickel, cobalt, and manganese is used when producing a high-nickel positive electrode of a layered structure. However, when a precursor containing cobalt is used, if the content of the cobalt is small, there is a problem in that a rock salt phase is easily formed on the surface of a positive electrode active material. However, as in the present invention, when a hydroxide or an oxyhydroxide not containing cobalt but containing nickel, manganese, and aluminum is used as a precursor, and the precursor is mixed with a cobalt-containing raw material and a lithium raw material, and then fired to produce a positive electrode active material, the formation of a rock salt phase is effectively suppressed even with a small amount of cobalt, and thus, the deterioration in output and charge and discharge properties due to the rock salt phase is prevented.

Meanwhile, the transition metal precursor may be a commercially available one purchased and used, or may be prepared according to a method for preparing a transition metal precursor well known in the art.

For example, the transition metal precursor may be prepared by adding a metal solution containing a nickel-containing raw material, a manganese-containing raw material, and an aluminum-containing raw material with an ammonium cation-containing complex formation agent and a basic compound, and subjecting the mixture to a co-precipitation reaction. When a transition metal precursor includes a doping element M, the metal solution may further include a raw material containing the doping element M.

The nickel-containing raw material may be, for example, an acetate, a nitrate, a sulfate, a halide, a sulfide, a hydroxide, an oxide, or an oxyhydroxide, and the like, all containing nickel, specifically $Ni(OH)_2$, NiO, NiOOH, $NiCO_3.2Ni(OH)_2.4H_2O$, $NiC_2O_2.2H_2O$, $Ni(NO_3)_2.6H_2O$, $NiSO_4$, $NiSO_4.6H_2O$, a fatty acid nickel salt, a nickel halide, or a combination thereof, but is not limited thereto.

The manganese-containing raw material may be an acetate, a nitrate, a sulfate, a halide, a sulfide, a hydroxide, an oxide, or an oxyhydroxide, and the like, all containing manganese, specifically a manganese oxide such as $Mn_2O_3$, $MnO_2$, $Mn_3O_4$, and the like, a manganese salt such as manganese acetate, dicarboxylic acid manganese, citric acid manganese, and fatty acid manganese salt, oxyhydroxide, manganese chloride, or a combination thereof, but is not limited thereto.

The aluminum-containing raw material may be an aluminum-containing acetate, an aluminum-containing nitrate, an aluminum-containing sulfate, an aluminum-containing halide, an aluminum-containing sulfide, an aluminum-containing hydroxide, an aluminum-containing oxide, an aluminum-containing oxyhydroxide, or a mixture thereof. For example, the aluminum-containing raw material may be $Al_2O_3$, $Al(OH)_3$, $AlSO_4$, $AlCl_3$, Al-isopropoxide, $AlNO_3$, AlF, or a combination thereof, but is not limited thereto.

The M-containing raw material may be an acetate, a nitrate, a sulfate, a halide, a sulfide, a hydroxide, an oxide, an oxyhydroxide, or a mixture thereof, all containing the element M (one or more selected from Ba, Ca, Zr, Ti, Mg, Ta, Nb, and Mo).

The metal solution may be prepared by adding a nickel-containing raw material, a manganese-containing raw material, and an aluminum-containing raw material to a solvent, specifically water or a mixed solvent of water and an organic solvent which can be uniformly mixed with water (for example, alcohol, etc.). Alternatively, the metal solution may be prepared by mixing an aqueous solution of the nickel-containing raw material, an aqueous solution of the manganese-containing raw material, and an aqueous solution of the aluminum-containing raw material.

The ammonium cation-containing complex formation agent may be, for example, $NH_4OH$, $(NH_4)_2SO_4$, $NH_4NO_3$, $NH_4Cl$, $CH_3COONH_4$, $NH_4CO_3$, or a combination thereof, but is not limited thereto. Meanwhile, the ammonium cation-containing complex formation agent may be used in the form of an aqueous solution. At this time, water, or a mixture of an organic solvent which may be uniformly mixed with water (for example, alcohol, etc.) and water may be used as a solvent.

The basic compound may be a hydroxide of an alkali metal or an alkaline earth metal such as NaOH, KOH or $Ca(OH)_2$, a hydrate thereof, or a combination thereof. The basic compound may also be used in the form of an aqueous solution. At this time, water, or a mixture of an organic solvent which may be uniformly mixed with water (for example, alcohol, etc.) and water may be used as a solvent.

The basic compound is added to control the pH of a reaction solution, and may be added in an amount such that the pH of the metal solution becomes 10.5 to 13, preferably 11 to 13.

Meanwhile, the co-precipitation reaction may be performed in an inert atmosphere, for example, in a nitrogen atmosphere or in an argon atmosphere, and the like, at a temperature of 40° C. to 70° C. In addition, in order to increase the reaction rate during the reaction, a stirring process may be selectively performed. At this time, the stirring rate may be 100 rpm to 2000 rpm.

Transition metal precursor particles are generated by the above process and precipitated in a reaction solution. The precipitated transition metal precursor particles are separated according to a typical method and dried to obtain a transition metal precursor.

(2) Mixing Nickel-Manganese-Aluminum Precursor, Cobalt Raw Material, and Lithium Raw Material and then Heat Treating the Mixture Next, the nickel-manganese-aluminum precursor obtained as described above is mixed with a cobalt raw material and a lithium raw material, and then the mixture is heat treated. In addition, if necessary, the doping element M-containing raw material may be mixed with the nickel-manganese-aluminum precursor, the cobalt raw material, and the lithium raw material.

At this time, the cobalt raw material may be an acetate, a nitrate, a sulfate, a halide, a sulfide, a hydroxide, an oxide, or an oxyhydroxide, and the like, all containing cobalt, specifically $Co_2O_3$, $Co(OH)_2$, CoOOH, $CO(OCOCH_3)_2.4H_2O$, $Co(NO_3)_2.6H_2O$, $Co(SO_4)_2.7H_2O$, or a combination thereof, but is not limited thereto.

In addition, the lithium raw material may be a carbonate (for example, lithium carbonate and the like), a hydrate (for example, lithium hydroxide hydrate ($LiOH.H_2O$) and the like), a hydroxide (for example, lithium hydroxide and the like), a nitrate (such as lithium nitrate ($LiNO_3$) and the like) and a chloride (such as lithium chloride (LiCl) and the like), and the like, all containing lithium, and any one thereof or a mixture of two or more thereof may be used.

The M-containing raw material may be an acetate, a nitrate, a sulfate, a halide, a sulfide, a hydroxide, an oxide, an oxyhydroxide, or a mixture thereof, all containing the element M (one or more selected from Ba, Ca, Zr, Ti, Mg, Ta, Nb, and Mo).

Meanwhile, the mixing of the transition metal precursor, the cobalt raw material, and the lithium raw material may be performed by solid state mixing such as jet milling.

In addition, the mixing ratio of the transition metal precursor, the cobalt raw material, and the lithium raw material may be determined to be in a range satisfying the atomic fraction of each component in a positive electrode active material to be finally produced. However, it is preferable that the cobalt raw material is mixed in an amount such that the content of cobalt in the positive electrode active material is 7000 ppm or less, preferably 4000-7000 ppm. When the content of cobalt satisfies the above range, the formation of a rock salt phase on the surface of a positive electrode active material may be effectively suppressed.

Next, the heat treatment is preferably performed at 730° C. to 780° C., preferably at 740° C. to 770° C., for 6 to 18 hours, preferably for 8 to 12 hours. When the heat treatment temperature is too high or the heat treatment duration is too long, the effect of suppressing a surface rock salt phase may be reduced. When the heat treatment temperature is too low or the heat treatment duration is too short, the synthesis of a positive electrode active material having a desired structure may be difficult.

<Positive Electrode Active Material>

A positive electrode active material of the present invention produced as described above is characterized in that a rock salt phase is hardly formed on a surface portion thereof even though nickel is contained in 90 atm % or greater and cobalt is contained in a very small content.

Specifically, the positive electrode active material of the present invention includes a lithium composite transition metal oxide containing nickel, manganese, aluminum, and cobalt, wherein the atomic fraction of nickel is 90 atm % or greater in all transition metals of the lithium composite transition metal oxide, the content of cobalt is 4000-7000 ppm based on the total weight of the lithium composite transition metal oxide, and the thickness of a rock salt phase formed on a surface portion of the lithium composite transition metal oxide is less than 5 nm.

More specifically, the positive electrode active material according to the present invention includes a lithium composite transition metal oxide represented by [Formula 3] below.

$$Li_x[Ni_yMn_zAl_wCo_vM_u]O_2 \quad \text{[Formula 3]}$$

In Formula 3, M is a doping element substituted for a transition metal site of the lithium composite transition metal oxide, and may be one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and $0.90 \leq x \leq 1.50$, $0.90 \leq y \leq 0.98$, $0.01 \leq z < 0.1$, $0.01 \leq w < 0.1$, $0.005 \leq v \leq 0.02$, $0 \leq u \leq 0.02$.

Specifically, x represents the atomic fraction of lithium in the lithium composite transition metal oxide, and x may be 0.9 to 1.5, preferably 0.9 to 1.2.

y represents the atomic fraction of nickel in all transition metals included in the lithium composite transition metal oxide, and y may be 0.9 to 0.98, preferably 0.92 to 0.95. The positive electrode active material of the present invention has a high atomic fraction of nickel as described above, and thus, may implement high-capacity properties.

z represents the atomic fraction of manganese in all transition metals included in the lithium composite transition metal oxide, and z may be 0.01 to less than 0.1, preferably 0.01 to 0.05.

w represents the atomic fraction of aluminum in all transition metals included in the lithium composite transition metal oxide, and w may be 0.01 to less than 0.1, preferably 0.01 to 0.05.

v represents the atomic fraction of cobalt in all transition metals included in the lithium composite transition metal oxide, and v may be 0.005 to 0.02, preferably 0.08 to 0.15. The positive electrode active material of the present invention contains a small amount of cobalt as described above, and thus, is excellent in economic feasibility.

u represents the atomic fraction of a doping element M among all transition metals included in the lithium composite transition metal oxide, and u may be 0 to 0.02.

Meanwhile, the positive electrode active material produced according to the producing method of the present invention has almost no rock salt phase formed on a surface portion of the lithium composite transition metal oxide. Specifically, the thickness of a rock salt phase formed on a surface portion of the positive electrode active material of the present invention may be less than 5 nm, preferably 0-4 nm. More preferably, the positive electrode active material of the present invention may not contain a rock salt phase.

Meanwhile, the positive electrode active material according to the present invention may further include, if necessary, a coating layer on the surface of the lithium composite transition metal oxide, the coating layer including at least one coating element selected from the group consisting of one or more elements selected from the group consisting of Al, Ti, W, B, F, P, Mg, Ni, Co, Fe, Cr, V, Cu, Ca, Zn, Zr, Nb, Mo, Sr, Sb, Bi, Si, and S. When the coating layer is included as described above, the contact between the positive electrode active material and an electrolyte is suppressed, thereby reducing the occurrence of a side reaction. Therefore, when applied to a battery, lifespan properties may be improved, and furthermore, the filling density of the positive electrode active material may be increased.

When a coating element is further included as described above, the content of the coating element in the coating layer may be 100 ppm to 10,000 ppm, preferably 200 ppm to 5,000 ppm based on the total weight of the positive electrode active material. When the content of the coating element satisfies the above range, the occurrence of a side reaction with an electrolyte is more effectively suppressed, and when applied to a battery, the lifespan properties of the battery may be further improved.

The coating layer may be formed on the entire surface or on a portion of the surface of the positive electrode active material. Specifically, when the coating layer is formed on a portion of the surface of the positive active material, the coating layer may be formed in an area of 5% to less than 100%, preferably 20% to less than 100% of the total surface area of the positive electrode active material.

As described above, the positive electrode active material according to the present invention does not contain a rock salt phase on a surface portion thereof, the rock salt phase causing the deterioration in output properties and charge and discharge properties, thereby exhibiting excellent output properties and charge and discharge properties. In addition, the positive electrode active material according to the present invention has very excellent high-temperature lifespan properties while having a very high content of nickel.

In addition, the positive electrode active material according to the present invention contains nickel in 90 atm % or greater, and thus, exhibits excellent capacity properties.

<Positive Electrode and Secondary Battery>

The positive electrode active material according to the present invention may be usefully used in manufacturing a positive electrode for secondary battery.

Specifically, a positive electrode according to the present invention includes the positive electrode active material according to the present invention. More specifically, the positive electrode includes a positive electrode current collector and a positive electrode active material layer formed on the positive electrode current collector. At this time, the positive electrode active material layer may include the positive electrode active material according to the present invention. The detailed description of the positive electrode active material according to the present invention is the same as described above, and thus, a detailed description thereof will be omitted.

The positive electrode may be manufactured according to a typical method for manufacturing a positive electrode except that the positive electrode active material according to the present invention is used. For example, the positive electrode may be manufactured by manufacturing a positive electrode mixture by dissolving or dispersing components constituting a positive electrode active material layer, which are a positive electrode active material, a conductive material and/or a binder, in a solvent, applying the mixture on at least one surface of a positive electrode current collector, followed by drying and then roll-pressing. Alternatively, the positive electrode may be manufactured by casting the positive electrode mixture on a separate support, and then laminating a film obtained by being peeled off from the support on the positive electrode current collector.

At this time, the positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 µm to 500 µm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

On at least one surface of the current collector, a positive electrode active material layer including the positive electrode active material according to the present invention, and when necessary, further including at least one of a conductive material or a binder optionally is disposed.

The positive electrode active material may be included in an amount of 80-99 wt %, more specifically 85-98 wt % based on the total weight of the positive electrode active material layer. When included in the above content range, excellent capacity properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on the total weight of the positive electrode active material layer.

Also, the binder serves to improve the bonding between positive electrode active material particles and the adhesion between the positive electrode active material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of the positive electrode active material layer.

Meanwhile, the solvent used for preparing the positive electrode mixture may be a solvent commonly used in the art. For example, dimethyl sulfoxide (DMSO), isopropyl alcohol, N-methylpyrrolidone (NMP), acetone, water, and the like may be used alone, or a mixture thereof may be used. The amount of the solvent to be used may be appropriately adjusted in consideration of the applying thickness, preparation yield, viscosity, and the like of a slurry.

Next, a secondary battery according to the present invention will be described.

The secondary battery according to the present invention includes a positive electrode, a negative electrode disposed to face the positive electrode, a separator interposed between the positive electrode and the negative electrode, and an electrolyte. At this time, the positive electrode is the positive electrode according to the present invention described above.

Meanwhile, the secondary battery may further include a battery case for accommodating an electrode assembly composed of the positive electrode, the negative electrode, and the separator, and a sealing member for sealing the battery case, optionally.

In the secondary battery, the negative electrode includes a negative electrode current collector and a negative electrode active material layer disposed on at least one surface of the negative electrode current collector.

The negative electrode may be manufactured according to a typical manufacturing method of a negative electrode known in the art. For example, the negative electrode may be manufactured by manufacturing a negative electrode mixture by dissolving or dispersing components constituting a negative electrode active material layer, which are a negative electrode active material, a conductive material and/or a binder, in a solvent, applying the mixture on at least one surface of a negative electrode current collector, followed by drying and then roll-pressing.

The negative electrode current collector is not particularly limited as long as it has high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode collector may typically have a thickness of 3 µm to 500 µm, and as in the case of a positive electrode current collector, microscopic irregularities may be formed on the surface of the negative electrode current collector to improve the adhesion of the negative electrode active material. For example, the negative electrode current collector may be used in various forms such as a film, a sheet, a foil, a net, a porous body, a foam, and a non-woven body.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_v(0<v<2)$, $SnO_2$, a vanadium oxide, and a lithium vanadium oxide; or a composite including the metallic compound and the carbonaceous material such as a Si—C composite or a Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Also, the binder and the conductive material may be the same as those described above in the description of the positive electrode.

Meanwhile, in the secondary battery, the separator is to separate the negative electrode and the positive electrode and to provide a movement path for lithium ions. Any separator may be used without particular limitation as long as it is typically used as a separator in a secondary battery. Particularly, a separator having high moisture-retention ability for an electrolyte as well as low resistance to the movement of electrolyte ions is preferable. Specifically, as the separator, a porous polymer film, for example, a porous polymer film prepared from a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point or polyethylene terephthalate fiber, and the like may be used. Furthermore, a coated separator including a ceramic component or a polymer material may be used to secure heat resistance or mechanical strength, and may be used in a single-layered or a multi-layered structure, selectively.

Meanwhile, the electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used as the organic solvent. Among the above, a carbonate-based solvent is preferable, and a mixture of a cyclic carbonate (e.g., ethylene carbonate or propylene carbonate) having high ionic conductivity and high dielectric constant and a linear carbonate-based compound having low viscosity (e.g., ethylmethyl carbonate, dimethyl carbonate, or diethyl carbonate), the mixture which may increase charging/discharging performance of a battery, is more preferable.

Any lithium salt may be used as the lithium salt without particular limitation as long as it is typically used in an electrolyte for a lithium secondary battery. For example, $Li^+$ may be included as a positive ion of the lithium salt, and a negative ion thereof may be at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$. Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof.

The content of the lithium salt may be appropriately changed within a typical range in which a lithium salt may be used. Specifically, the lithium salt may be included in an electrolyte in a range of 0.8 M to 3 M, specifically 1 M to 2.5 M.

In the electrolyte, in order to improve the lifespan properties of a battery, suppress the reduction in battery capacity, and improve the discharge capacity of the battery, and the like, various additives may be used in addition to the above electrolyte components. As the additives, for example, a halo-alkylene carbonate-based compound such as difluoroethylene carbonate; or pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be included, and the above additives may be used alone or in combination. At this time, the additive may be included in an amount of 0.1 wt % to 5 wt % based on the total weight of the electrolyte.

The lithium secondary battery according to the present invention such as described above may be usefully used in portable devices such as a mobile phone, a notebook computer, and a digital camera, and in electric cars such as a hybrid electric vehicle (HEV).

Accordingly, according to another embodiment of the present invention, a battery module including the lithium secondary battery as a unit cell and a battery pack including the battery module are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium-and-large-sized battery module including a plurality of battery cells.

Hereinafter, examples of the present invention will be described in detail so that those skilled in the art can easily carry out the present invention. The present invention may, however, be embodied in many different forms and is not limited to the examples set forth herein.

Example 1

$Ni_{0.92}Mn_{0.04}Al_{0.04}O \cdot OH$, $LiOH \cdot H_2O$, and $Co_3O_4$ were mixed at a weight ratio of 66.6:32.8:0.6, and the mixture was heat treated at 750° C. for 12 hours to produce $Li(Ni_{0.91}Mn_{0.04}Al_{0.04}Co_{0.01})O_2$. The content of cobalt in the positive electrode active material produced as described above was about 6200 ppm.

Example 2

$Li(Ni_{0.913}Mn_{0.04}Al_{0.04}Co_{0.007})O_2$ was produced in the same manner as in Example 1 except that $Ni_{0.92}Mn_{0.04}Al_{0.04}O \cdot OH$, $LiOH \cdot H_2O$, and $Co_3O_4$ were mixed at a weight ratio of 66.7:32.9:0.4. The content of cobalt in the positive electrode active material produced as described above was about 4000 ppm.

Comparative Example 1

$Ni_{0.92}Mn_{0.04}Al_{0.04}O \cdot OH$ and $LiOH \cdot H_2O$ were mixed at a weight ratio of 67:23, and the mixture was heat treated at 750° C. for 12 hours to produce $Li(Ni_{0.92}Mn_{0.04}Al_{0.04})O_2$.

Comparative Example 2

$Ni_{0.91}Mn_{0.04}Al_{0.04}Co_{0.01}O \cdot OH$ and $LiOH \cdot H_2O$ were mixed at a weight ratio of 67:12, and the mixture was heat treated at 750° C. for 12 hours to produce $Li(Ni_{0.91}Mn_{0.04}Al_{0.04}Co_{0.01})O_2$. The content of cobalt in the positive electrode active material produced as described above was about 6300 ppm.

Experimental Example 1

The surface of the positive electrode active material produced by each of Example 1 and Comparative Examples 1 and 2 was photographed through a transmission electron microscope to observe the presence of a rock salt phase on a surface portion of the positive electrode active material.

Figure 2:
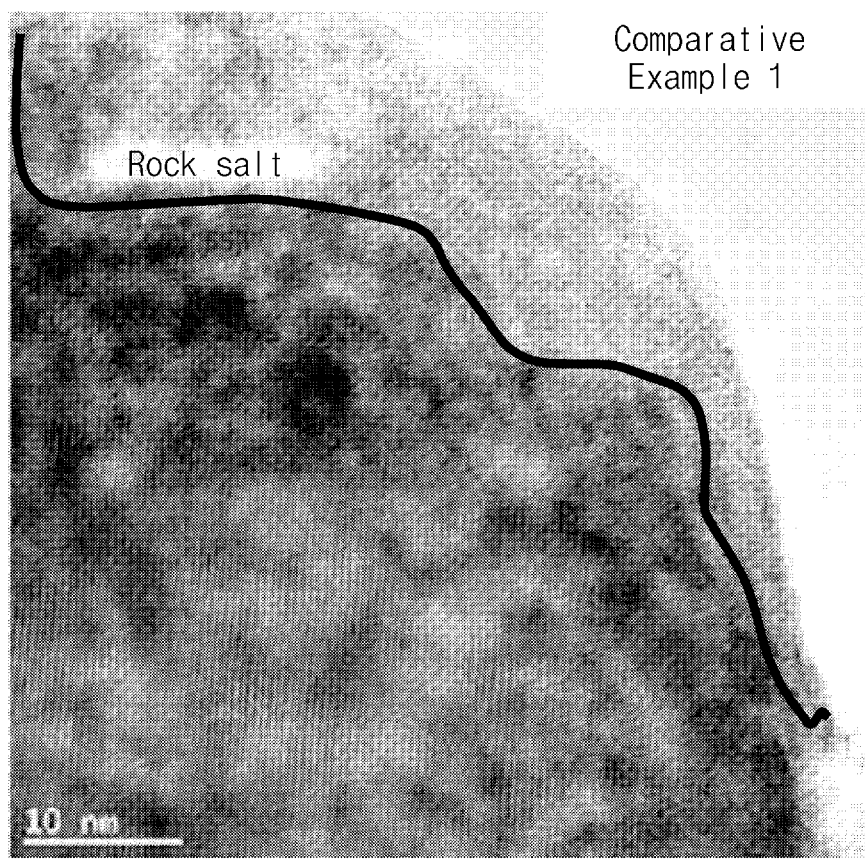
FIG. 2 is a transmission electron microscope (TEM) photograph of the surface of a positive electrode active material produced by Comparative Example 1.
Figure 3:
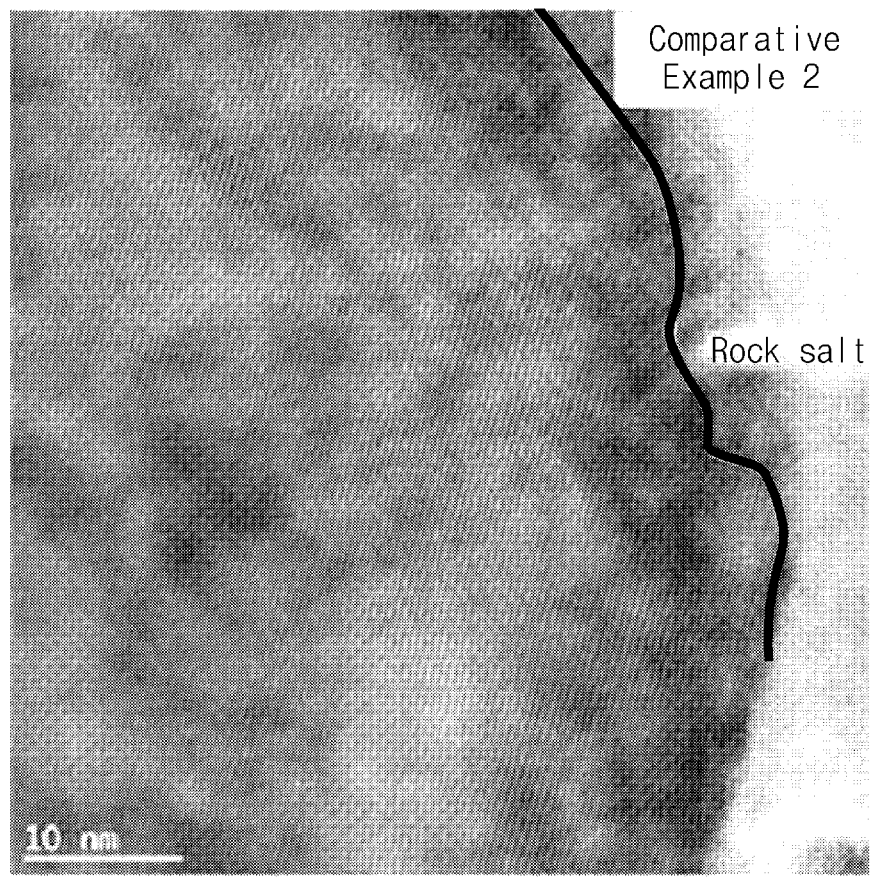
FIG. 3 is a transmission electron microscope (TEM) photograph of the surface of a positive electrode active material produced by Comparative Example 2.

FIG. 1 shows a TEM photograph of the positive electrode active material of Example 1. FIG. 2 shows a TEM photograph of the positive electrode active material of Comparative Example 1. FIG. 3 shows a TEM photograph of the positive electrode active material of Comparative Example 2.

As shown in FIG. 1 to FIG. 3, the positive electrode active material of Example 1 which was produced according to the method of the present invention had no rock salt phase on a surface portion thereof. On the contrary, the positive electrode active material of Comparative Example 1 in which cobalt was not contained had a thick rock salt phase formed to a thickness of about 10 nm. The positive electrode active material of Comparative Example 2 in which a cobalt-containing precursor was used had a rock salt phase formed to about 5 nm even through the cobalt content thereof was almost equal to that of Example 1.

<Manufacturing Lithium Secondary Battery>

The positive electrode active material produced by each of Examples 1 and 2 and Comparative Examples 1 and 2, a carbon black conductive material, and a PVdF binder were mixed in an N-methylpyrrolidone solvent at a weight ratio of 96.5:1.5:2 to prepare a positive electrode mixture material, and the positive electrode mixture material was applied on one surface of an aluminum current collector, dried 130° C., and then roll-pressed to manufacture a positive electrode.

A lithium metal film was used as a negative electrode.

A separator was interposed between the positive electrode and the negative electrode manufactured as described, and then an electrolyte was injected thereto to manufacture a lithium secondary battery.

Experimental Example 2: Evaluation of Initial Charge and Discharge Properties

The lithium secondary battery applied with the positive electrode active material of each of Examples 1 and and Comparative Examples 1 and 2 produced as described above was subjected to an initial charge and discharge properties evaluation.

Figure 4:
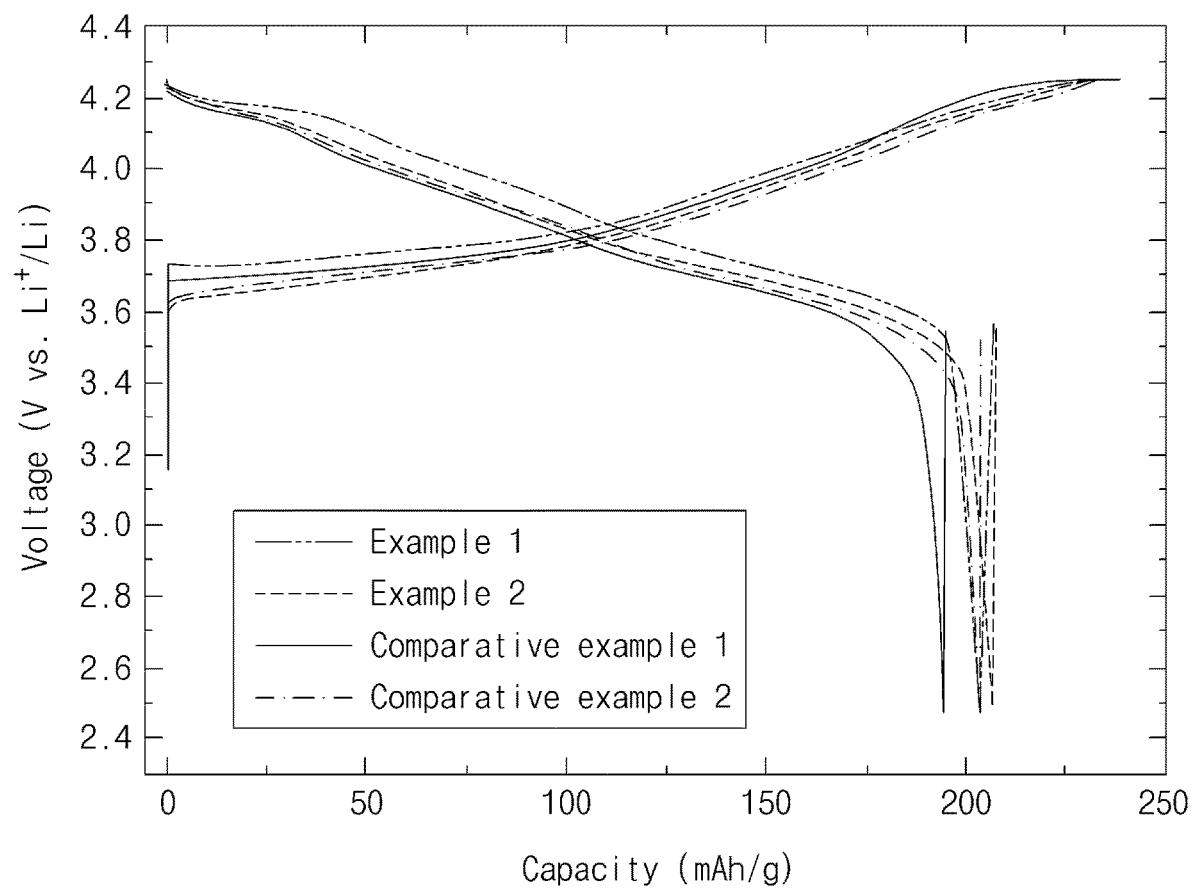
FIG. 4 is a graph showing the initial charge and discharge curve of a lithium secondary battery including the positive electrode active material of each of Examples 1 and and Comparative Examples 1 and 2 measured according to Experimental Example 2.

The initial charge and discharge properties evaluation was performed by charging the lithium secondary battery to 4.25 V with a constant current of 0.2 C at 25° C., and then while maintaining 4.25 V, charging the same until a current of 0.005 C flowed. Thereafter, the lithium secondary battery was discharged to 2.5 V with a constant current of 0.2 C. The results are shown in FIG. 4 below. As shown in FIG. 4, the lithium secondary battery applied with the positive electrode active material of each of Examples 1 and 2 had excellent initial charge and discharge properties when compared with the lithium secondary battery applied with the positive electrode active material of each of Comparative Examples 1 and 2.

Experimental Example 3: Evaluation of Lifespan Properties

The lithium secondary battery applied with the positive electrode active material of each of Examples 1 to 2 and Comparative Examples 1 to 2 produced as described above was subjected to a lifespan properties evaluation according to the following method.

The lithium secondary battery was charged to 4.2 V with 0.3 C at 45° C. and discharged to 2.5 V with a constant current of 0.3 C for 30 times each to perform 30 cycles of charge and discharge. Thereafter, the discharge capacity retention rate and the resistance increase rate (DCIR increase rate) were measured after the 30$^{th}$ cycle based on the discharge capacity and resistance after the 1$^{st}$ cycle. The measurement results are shown in FIG. 5 below.

Figure 5:
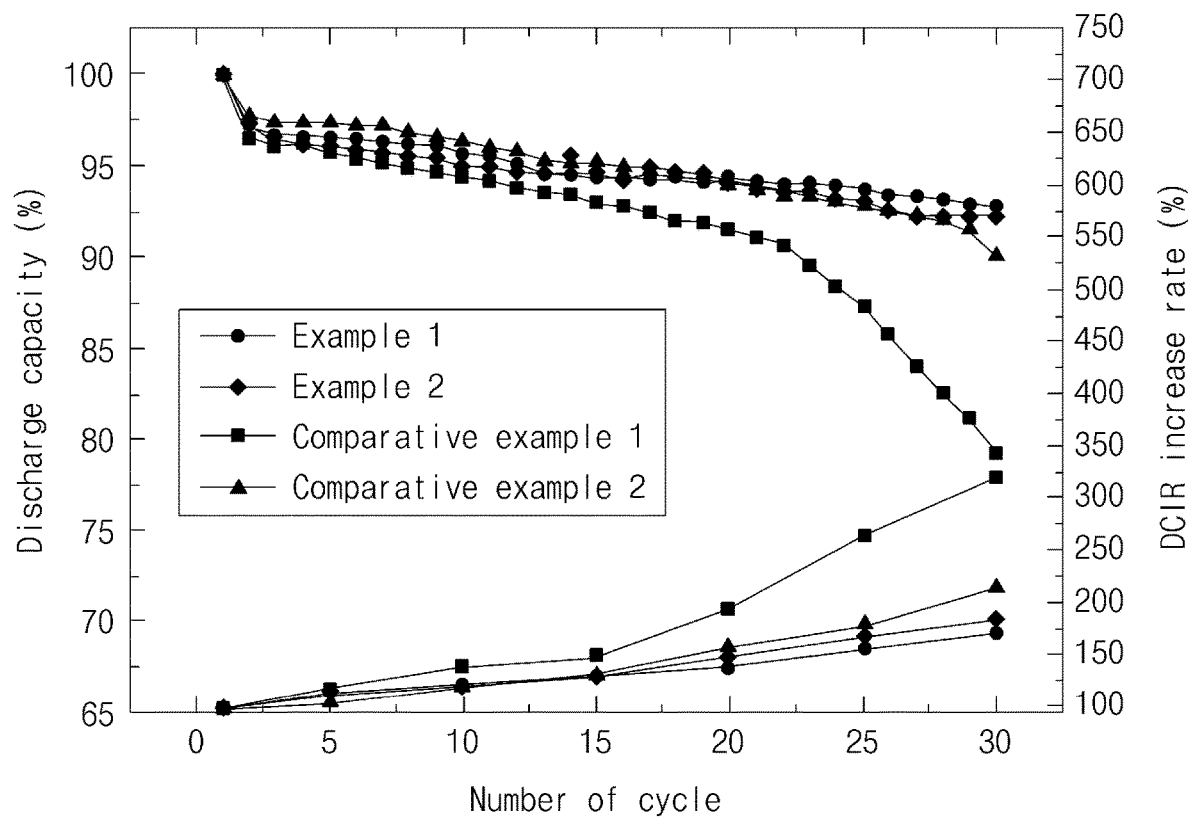
FIG. 5 is a graph showing the high-temperature lifespan properties of a lithium secondary battery including the positive electrode active material of each of Examples 1 and 2 and Comparative Examples 1 and 2 measured according to Experimental Example 3.

As shown in FIG. 5, the lithium secondary battery applied with the positive electrode active material of each of Examples 1 and 2 produced by the method of the present invention had excellent lifespan properties when compared with the lithium secondary battery applied with the positive electrode active material of each of Comparative Examples 1 and 2.

Experimental Example 4: Evaluation of Rate Properties

The lithium secondary battery applied with the positive electrode active material of each of Example 1 and Comparative Example 2 produced as described above was subjected to a rate properties evaluation according to the following method.

On the lithium secondary battery charged and discharged one time with 0.2 C, 0.5 C charge/0.1 C discharge, 0.5 C charge/0.5 C discharge, 0.5 C charge/1.0 C discharge, 0.5 C charge/1.5 C discharge, and 0.5 C charge/2.0 C were sequentially performed to confirm the discharge capacity. All evaluations were performed in a voltage range of 2.5-4.25 V and at 25° C.

Figure 6:
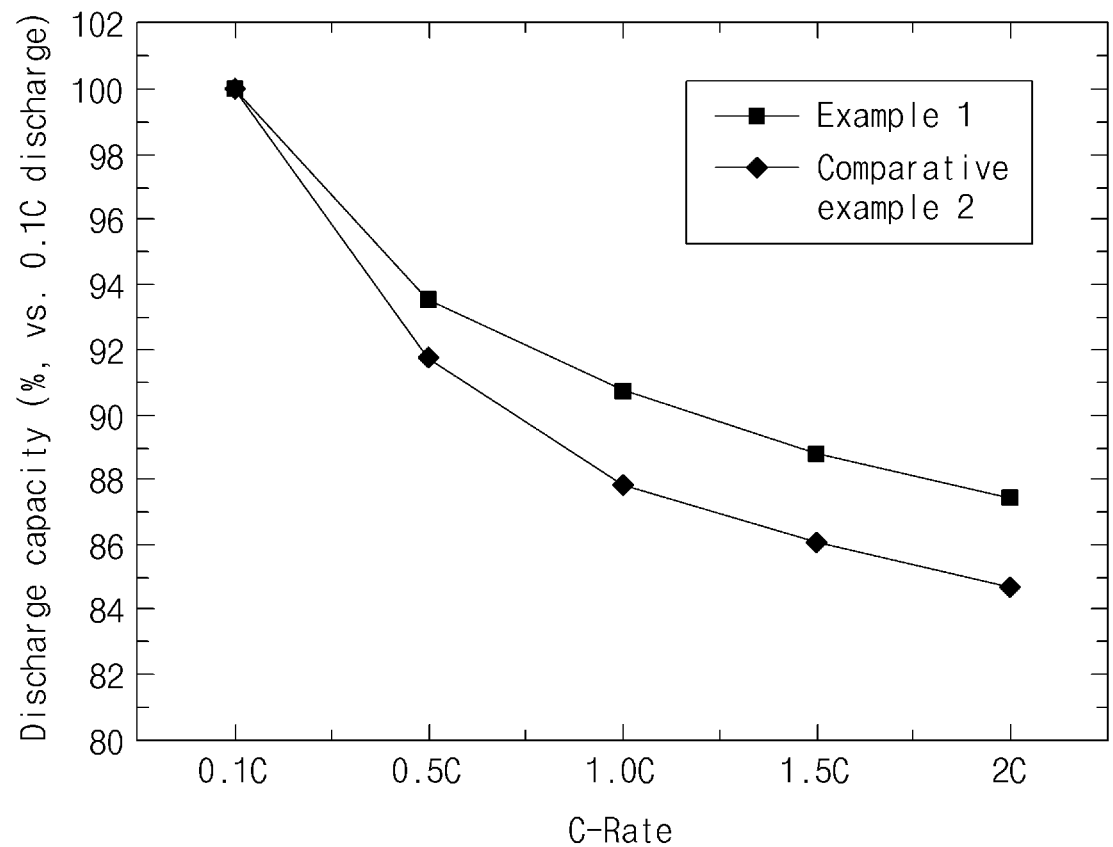
FIG. 6 is a graph showing the rate properties of a lithium secondary battery including the positive electrode active material of each of Example 1 and Comparative Example 2 measured according to Experimental Example 4.

The measurement results are shown in FIG. 6 below. As shown in FIG. 6, the lithium secondary battery applied with the positive electrode active material of Example 1 produced by using a precursor not containing cobalt had excellent rate properties when compared with the lithium secondary battery applied with the positive electrode active material of Comparative Example 2 in which a cobalt-containing precursor was used.

The invention claimed is:

1. A method for producing a positive electrode active material, comprising:
   preparing a nickel-manganese-aluminum precursor having an atomic fraction of nickel of 90 atm % or greater in all transition metals of the nickel-manganese-aluminum precursor; and
   mixing the nickel-manganese-aluminum precursor, a cobalt raw material, and a lithium raw material to obtain a mixture; and
   heat treating the mixture.

2. The method of claim 1, wherein the nickel-manganese-aluminum precursor does not contain cobalt.

3. The method of claim 1, wherein the nickel-manganese-aluminum precursor is represented by either Formula 1 below or Formula 2 below:

$$Ni_{a1}Mn_{b1}Al_{c1}M_{d1}O \cdot OH \qquad [\text{Formula 1}]$$

in Formula 1, M is one or more selected from the group consisting of W, Cu, Fe, Ba, V, Cr, Ti, Zr, Zn, In, Ta, Y, In, La, Sr, Ga, Sc, Gd, Sm, Ca, Ce, Nb, Mg, B, and Mo, and $0.90 \leq a1 \leq 0.98$, $0.01 \leq b1 < 0.1$, $0.01 \leq c1 < 0.1$, and $0 \leq d1 \leq 0.02$, $$Ni_{a2}Mn_{b2}Al_{c2}M_{d2}(OH)_2 \qquad [\text{Formula 2}]$$

in Formula 2, M is one or more selected from the group consisting of W, Cu, Fe, Ba, V, Cr, Ti, Zr, Zn, In, Ta, Y, In, La, Sr, Ga, Sc, Gd, Sm, Ca, Ce, Nb, Mg, B, and Mo, and $0.90 \leq a2 \leq 0.98$, $0.01 \leq b2 < 0.1$, $0.01 \leq c2 < 0.1$, and $0 \leq d2 \leq 0.02$.

4. The method of claim 1, wherein the cobalt raw material is mixed in an amount, wherein a content of cobalt in the positive electrode active material is 4000-7000 ppm.

5. The method of claim 1, wherein the heat treatment is performed at 730° C. to 780° C. for 6 to 18 hours.

6. The method of claim 3, wherein in Formulas 1 and 2, the M is a doping element.

* * * * *